United States Patent [19]

Shiota

[11] Patent Number: 5,895,853
[45] Date of Patent: Apr. 20, 1999

[54] SEMICONDUCTOR ACCELERATION SENSOR

[75] Inventor: Kunihiro Shiota, Tokyo, Japan

[73] Assignee: NEC Corporation, Tokyo, Japan

[21] Appl. No.: 08/606,273

[22] Filed: Feb. 23, 1996

[30] Foreign Application Priority Data

Feb. 23, 1995 [JP] Japan .................... 7-058285

[51] Int. Cl.$^6$ ........................... G01P 15/00
[52] U.S. Cl. ............. 73/514.36; 73/774; 156/292; 156/295; 156/625.1; 437/921
[58] Field of Search .................. 73/514.34, 514.36, 73/726, 727, 715, 862.338, 862.474, 774, 514.33, 522, 521, 526; 257/419; 338/2, 4, 42; 29/621.1, 25.35; 437/921; 156/625.1, 626.1, 292, 295

[56] References Cited

U.S. PATENT DOCUMENTS

| | | | |
|---|---|---|---|
| 5,060,504 | 10/1991 | White et al. | 73/514.33 |
| 5,221,400 | 6/1993 | Staller et al. | 156/292 |
| 5,284,057 | 2/1994 | Staller et al. | 73/514.36 |
| 5,351,542 | 10/1994 | Ichimura et al. | 73/514.33 |
| 5,471,876 | 12/1995 | Yano | 73/514.33 |
| 5,500,078 | 3/1996 | Lee | 156/628.1 |
| 5,605,598 | 2/1997 | Greiff | 156/630.1 |
| 5,626,779 | 5/1997 | Okada | 219/201 |

FOREIGN PATENT DOCUMENTS

| | | |
|---|---|---|
| 4-274005 | 9/1992 | Japan. |
| 5-41148 | 2/1993 | Japan. |

*Primary Examiner*—Hezron E. Williams
*Assistant Examiner*—Richard A. Moller
*Attorney, Agent, or Firm*—Sughrue, Mion, Zinn, Macpeak & Seas, PLLC

[57] ABSTRACT

It is the object of the invention to provide a semiconductor acceleration sensor, in which the characteristic is stable, even if minute spherical particle intrudes into the clearance of the sensor, and a yielding rate and a reliability are remarkably improved. The upper and lower surfaces of a sensor chip, which is composed of a weight portion and beams supporting it, are put between the upper and lower stopper substrates. The surfaces of the upper and lower substrates, which face the sensor chip, have engraved areas thereon, and are stuck to the aforementioned sensor chip via adhesive portions. The adhesive portion is filled with a mixture of adhesive agent and minute spherical hard plastics particle with a equal diameter. The width clearance between sensor chip and stopper substrate is determined by the diameter of the minute spherical particle made of hard plastics.

8 Claims, 6 Drawing Sheets

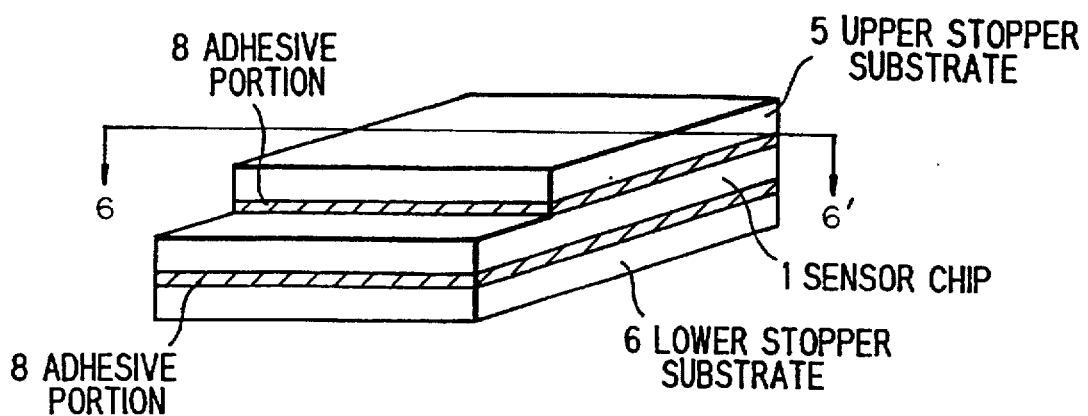
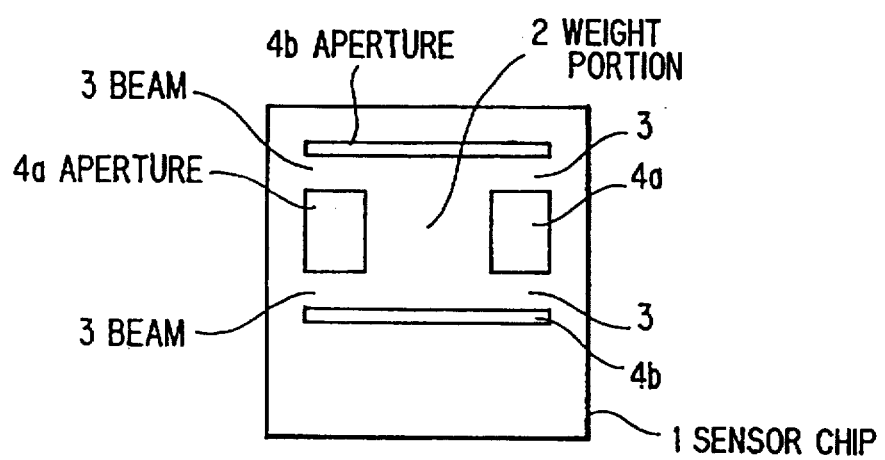
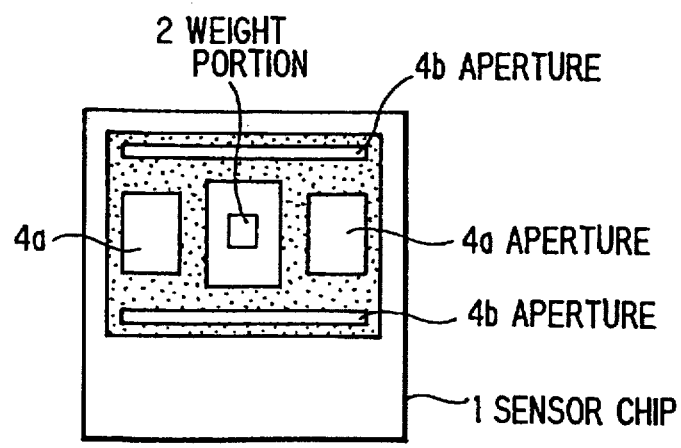

FIG. 8(a)
SiO₂ FILM FORMING

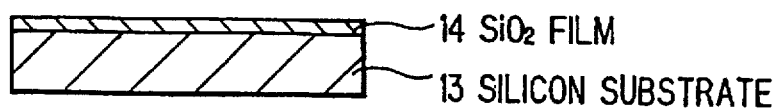
— 14 SiO₂ FILM
— 13 SILICON SUBSTRATE

FIG. 8(b)
PHOTO-RESIST COATING

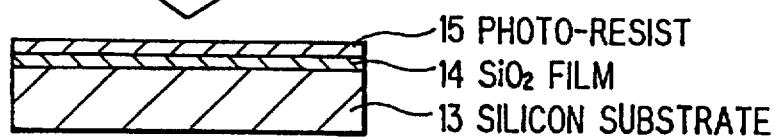
— 15 PHOTO-RESIST
— 14 SiO₂ FILM
— 13 SILICON SUBSTRATE

FIG. 8(c)
EXPOSURE AND DEVELOPMENT

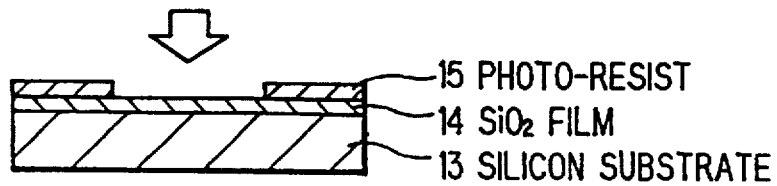
— 15 PHOTO-RESIST
— 14 SiO₂ FILM
— 13 SILICON SUBSTRATE

FIG. 8(d)
OXIDE FILM ETCHING

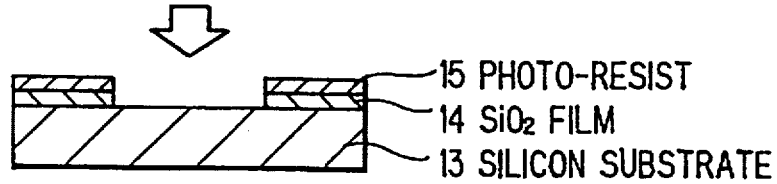
— 15 PHOTO-RESIST
— 14 SiO₂ FILM
— 13 SILICON SUBSTRATE

FIG. 8(e)
PEELING-OFF RESIST FILM

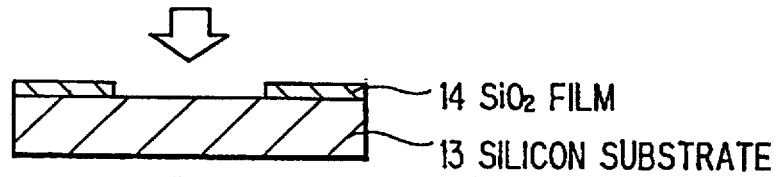
— 14 SiO₂ FILM
— 13 SILICON SUBSTRATE

FIG. 8(f)
SILICON ETCHING

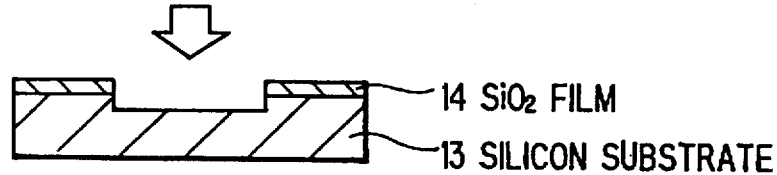
— 14 SiO₂ FILM
— 13 SILICON SUBSTRATE

FIG. 8(g)
OXIDE-FILM REMOVING

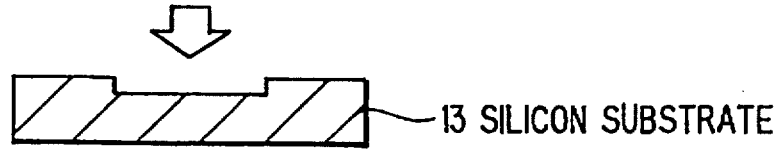
— 13 SILICON SUBSTRATE

SEMICONDUCTOR ACCELERATION SENSOR

FIELD OF THE INVENTION

This invention relates to a semiconductor acceleration sensor, especially to a semiconductor acceleration sensor, which is provided with clearances in upper and lower sides of a weight portion thereof, in order to assure the movement of the weight portion.

BACKGROUND OF THE INVENTION

Recently, the drivers of automobiles have directed their attention to air-bag safety systems, which protect them during unexpected collisions. One of the important technologies in the air-bag safety system is an acceleration sensor, which detects the occurance of a collision. In early years, a mechanical acceleration sensor was used, but its structure was not simple; its size and a weight were not small; its cost was high, and its response was not fast. Subsequently, engineers of the air-bag safety system placed their hopes on a semiconductor acceleration sensor. The essential portion of the semiconductor acceleration sensor comprises a weight portion, which is supported by beams at the right and left edges thereof, and the vector of the acceleration of the weight portion is perpendicular to the beams. It can be seen that an inertial force acting on the weight portion causes bending stresses in the beams, and thereby piezo-electric resistances are caused in the beams, from which the value of the acceleration of the weight portion can be detected. In the semiconductor acceleration sensor, clearances are formed around the weight portion, in order to assure the free movement of the weight portion.

Although almost all disadvantages of the mechanical acceleration sensor are swept away by the semiconductor acceleration sensor, many other difficulties arise in this sensor. One problem is that when foreign bodies get into the clearances, movement of the weight portion is largely disturbed. Another problem is that overcoming the aforementioned difficulties only by a high precision machining process requires a large amount of investment, and this way will not be adopted from an economical view point.

SUMMARY OF THE INVENTION

Accordingly, it is the object of the invention to provide a semiconductor acceleration sensor, which can be produced with high yielding rate and is sufficiently reliable, by improving the accuracies of the clearances between the stopper substrates and the weight portion, and removing a primary factor of the obstruction against the movement of the weight portion.

According to the invention, a semiconductor acceleration sensor, comprises:

- a sensor chip, which is composed of a weight portion and at least two beam portions for supporting the weight portion at both side ends thereof,
- two stopper substrates which run in parallel with each other and contain the sensor chip therebetween, wherein upper and lower surfaces of the sensor chip, or inner surfaces of the stopper substrate have engraved areas with predetermined depths, and
- two adhesive portions, which are a mixture of adhesive agent and minute spherical particles with an equal diameter, and stick the sensor chip to the stopper substrates.

BRIEF DESCRIPTION OF THE DRAWINGS

The invention will be explained in more detail in conjunction with the appended drawings, wherein:

FIG. 3 is a perspective view showing the first preferred embodiment of the invention.

FIGS. 4A to 4B are respectively a top and bottom views of a sensor chip of the first preferred embodiment of the invention.

FIGS. 8(a) to 8(g) are cross-sectional views showing manufacturing processes of the upper and lower stopper substrate in the first preferred embodiment of the invention.

DESCRIPTION OF THE PREFERRED EMBODIMENTS

Figure 1:
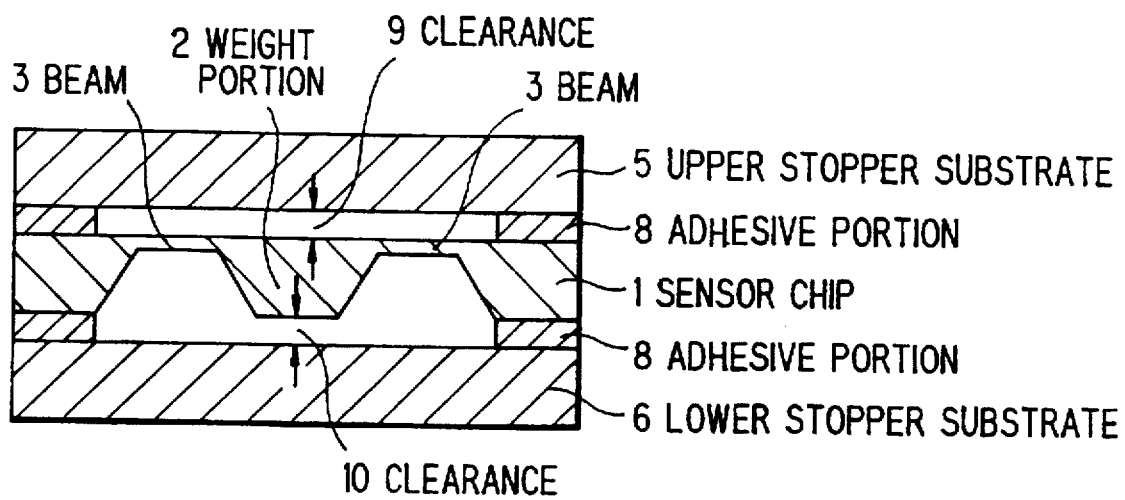
FIG. 1 is a cross-sectional view of the first conventional example.

Before explaining a semiconductor acceleration sensor in the preferred embodiment, the conventional semiconductor acceleration sensor will be explained in FIGS. 1 to 2. The semiconductor acceleration sensor detects an acceleration of a moving object by monitoring the Piezo electrical resistance of a semiconductor, and is widely used in a vehicle. FIG. 1 is a cross-sectional view of an example of a conventional semiconductor acceleration sensor (the first conventional example, hereinafter), which appears on Japanese Patent Kokai No. 4-274005. In the first conventional example, a sensor chip 1 is inserted between upper and lower stopper substrates 5 and 6 via adhesive portion 8s, as shown in FIG. 1. The sensor chip 1 is consisted of a weight portion 2, which is supported by beams 3s from both right and left sides.

In order to assure the free movement of the weight portion 2 and to protect the same against damage caused by its over vibration, narrow clearances 9 and 10 are formed between the weight portion 2 and the upper and lower stopper substrates 5 and 6. In order to assure the aforementioned necessary clearances, the adhesive portions 8s, which adhere the sensor chip 1 to the stopper substrates 5 and 6, are made of mixture of minute spherical particles with uniform diameter and adhesive agent. The stopper substrates 5 and 6 are made of silicon substrate in most cases.

Another example shown in FIG. 2 (the second conventional example 2, hereinafter) appears on Japanese Patent Kokai No. 5-41148. In this example, in order to assure the necessary clearances 9 and 10 between the weight portion 2 of the sensor chip 1 and the stopper substrates 5 and 6, the surfaces of these substrates, which face the sensor chip 1, are so engraved down that required clearances 9 and 10 can be assured, as shown in FIG. 2.

When adhesive technology is used in assembling the sensor, in order to obtain the smallest possible thickness of an adhesive portion, substrates are bonded by means of electro-statical bonding, Au to Si eutectic bonding or Au to Au diffusion bonding.

In the case of the first conventional example, since the clearance between the stopper substrate and the weight portion is assured only by the minute spherical particles, and then if the particles intrude into the clearance between the stopper substrate and the weight portion, the vibration of the weight portion is obstructed, and the function of the sensor is disturbed. Moreover, if minute spherical particles intrude into the clearance in practical usage, the sensor does not operate normally, and a grave accident will be quite within the bounds of possibility. That is to say, in the case of the first conventional example, it is very difficult to increase a yield rate, and satisfactory reliability cannot be ensured.

Figure 2:
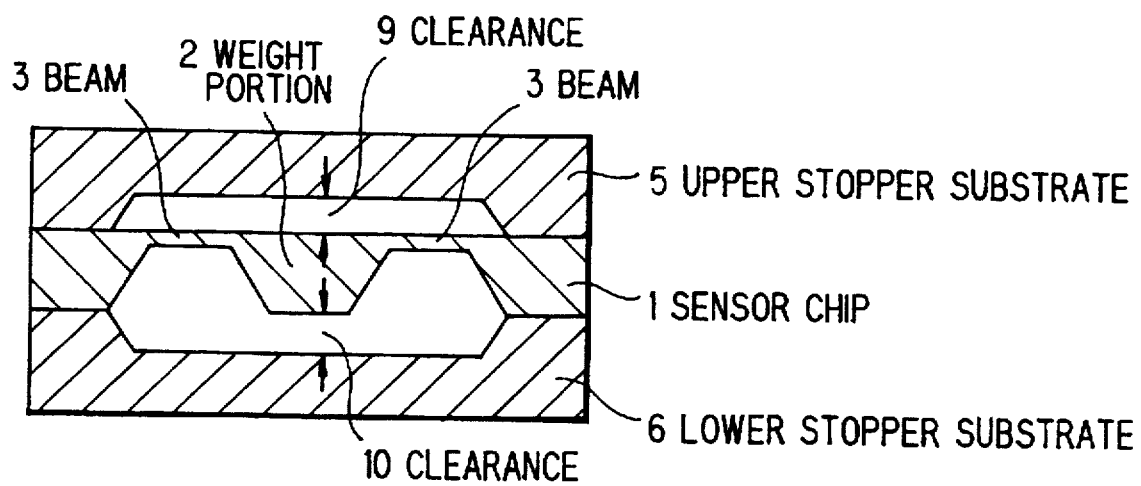
FIG. 2 is a cross-sectional view of the second conventional example.

In the second conventional example shown in FIG. 2, since the accuracy of the clearance between the stopper substrate and the weight portion can be assured only by the accuracies of manufacturing processes of the stopper substrates and the members of the structure, the characteristics of the sensor are easily fluctuated. The main cause of the imperfection of manufacturing process is that, the amount of engraving is not small, and the members of the structure are not so accurately formed. Accordingly, in order to obtain satisfactory results, the machining technology with high precision is required, but this way is not preferable from the economical view point. Moreover, if a electro-statical bonding is adopted, a flat bonding portion must be formed on the substrate with apertures or hollows, and a heat treatment at high temperature becomes necessary. These problems are very difficult to economically solve. Still more, if Au—Si eutectic bonding or Au—Au diffusion bonding is used, Au becomes necessary, and thereby a process will be complicated.

Next, the embodiments of the invention will be explained referring to the appended drawings.

FIG. 3 shows the perspective view of the first preferred embodiment of the invention of the semiconductor acceleration sensor. As shown in FIG. 3, the upper and lower surfaces of the sensor chip 1 are respectively covered with the upper and lower substrates 5 and 6 via adhesive portion 8s. The upper and lower substrate 5 and 6 are formed by silicon plate.

FIGS. 4A to 4B respectively show the upper and lower surfaces of the sensor chip 1. As shown in FIGS. 4A to 4B, the sensor chip 1 is provided with the aperture portions 4as and 4bs, which pass through the sensor chip 1 by an etching process. In FIG. 4B, an area represented by a pear skin pattern is engraved down by the etching process, and a remained portion denoted by 2 is the weight portion. Then, portions with thin thicknesses, being put between the apertures 4a and 4bs, serve as the beam portions 3s. Although not shown in the drawings, each beam portion 3 has two Piezo electric resistances (eight Piezo electric resistances per one sensor chip) are formed, as if they stride over the edges of beams.

Figure 5A:
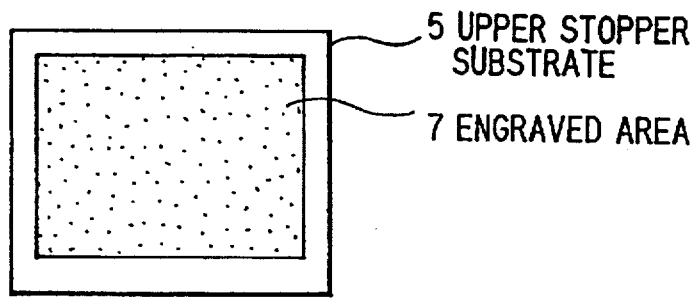
FIGS. 5A to 5B are respectively the bottom view of an upper stopper substrate and the top view of a lower stopper substrate of the first preferred embodiment of the invention.
Figure 5B:
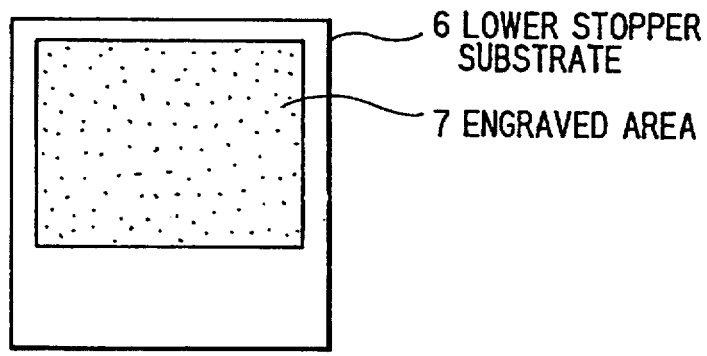

FIGS. 5A to 5B respectively show the bottom view of the upper stopper substrate 5 and the top view of the lower substrate 6. As shown in FIGS. 5A to 5B, the upper stopper substrate 5 and the lower stopper substrate 6 are respectively engraved by etching processes, and engraved areas 7s are formed in the both substrates in this embodiment.

Figure 6:
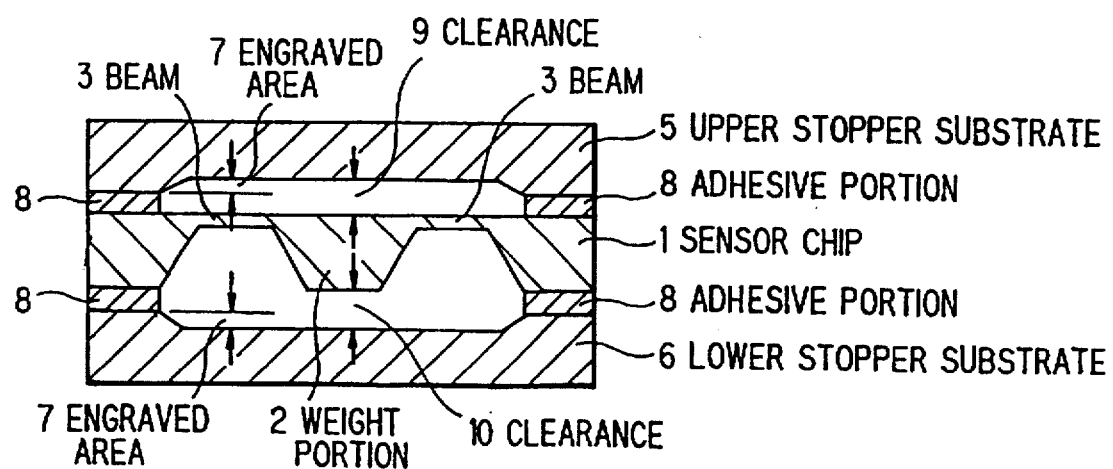
FIG. 6 shows a cross-sectional view of FIG. 3 in 6–6' cross-section.

FIG. 6 shows the cross-sectional view of the structure in an 6–6' cross-section in FIG. 3. As shown in FIG. 6, there are the clearances 9 and 10 with a certain values (10 to 15 μm, for example) between the weight portion 2 on the sensor chip 1 and the upper and lower stopper substrates. The spaces of the clearances 9 and 10 are respectively given as the sums of the depths of the adhesive portions 8s and the depths of the engraved areas 7s of the stopper substrates 5 and 6. The clearances 9 and 10 of the stopper substrates 5 and 6 regulates the movement of the weight portion 2 therein, and protect the beams 3s against damages due to over vibration of the weight portion 2.

Figure 7:
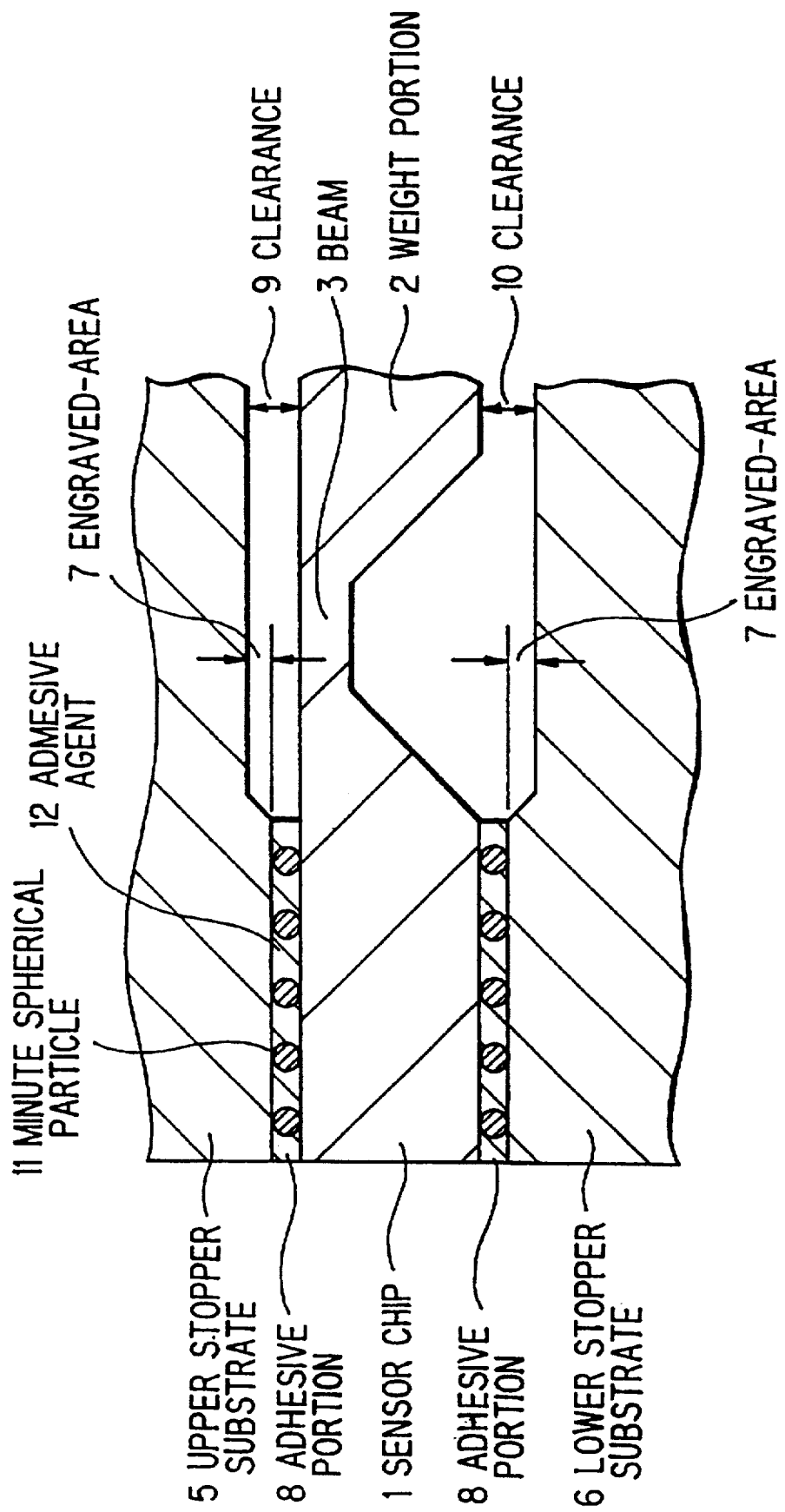
FIG. 7 shows a enlarged drawing of a portion of FIG. 6.

FIG. 7 is an enlarged drawing of a region of FIG. 6, which involves the adhesive portions 8s and two engraved area 7s. As shown in FIG. 7, the adhesive portion 8 is a mixture of adhesive agent 12 and minute spherical particles 11s, which have equal diameters and are uniformly distributed in the adhesive agent 12. The widths of the clearances between the sensor chip 1 and the stopper substrates 5 and 6 are determined by the diameters of the minute spherical particles 11. Accordingly, the widths of the clearances 9 and 10 are determined by the sum of the diameter of the minute spherical particles and the depths of the engraved areas 7s. The minute spherical particle 11 is made of hard plastics.

Nonuniformity of the thickness of the adhesive portion 8 between the processed substrate is largely affected by the amount of mixing of the minute particles with the adhesive agent. According to the experiments by the inventor, in order to make the nonunifomity of the thickness of the adhesive portion 8 be less than 1.0%, the amount of mixing of the minute particles 11 should be more than 1.0 wt %.

After suitably selecting the mass (4–6 g. for example) and the surface area (5–7 mm$^2$) of the weight portion 2 on the sensor chip 1, the maximum amount of the displacement of the weight portion (2 to 4 μm, for example) can be determined on the operational condition that the acceleration is 0–40 G. The depths of the engraved area 7 are so determined that the maximum movement of the weight portion 2 can be allowable.

The widths of the clearances 9 and 10, in other words, the interval between the weight portion and the stopper substrate, is so determined that the resonance of the weight portion during usage can be suppressed (12 to 16 μm, for example). The resonance is suppressed by the damping effect caused by the viscosity of the air, and the damping becomes maximum when the amplitude of the vibration is maximum. When the clearances 9 and 10 are determined as mentioned in the above and the depth of the engraved area is 2–4 μm, for example, the diameter of the minute particle is determined to be 10–12 μm.

By suitably selecting the dimensions of various important structural elements as mentioned in the above, the vibration of the weight portion is not disturbed, even if minute spherical particles enter the clearances between the stopper substrates and the weight portion. The volume occupied by minute spherical particles, which get into the clearances 9 and 10, is very small as compared with those of the clearances 9 and 10. Accordingly, the effect of the viscosity of the air on the movement of the weight portion is not changed, and the linear measurement can be assured in the rated range of the acceleration.

Moreover, even if dusts get into the clearances and their sizes are smaller than that of the minute spherical particle, the normal operation of the acceleration sensor is not disturbed. Consequently, a yield rate of the acceleration sensor can be remarkably increased from 10% to 70% by the technology according to the invention. Moreover, even if minute spherical foreign bodies, which are peeled off from the adhesive portion in usages, the function of the acceleration sensor is not deteriorated, and the reliability in the operation thereof can be increased.

Next, the method of manufacturing the stopper substrate will be explained referring to FIGS. 8(a)–8(g). FIGS. 8(a) to 8(g) are the cross-sectional views for explaining the manufacturing process of the upper stopper substrate 5. Firstly, the SiO$_2$ film 14 is formed on the on the silicon substrate 14 by thermal oxidization process (FIG. 8(a)). Next, a photo-resist 15 is coated thereon (FIG. 8(b)), which is patterned by the process of exposure and development (FIG. 8(c)). Next, the SiO$_2$ film 14 are etched, using the SiO$_2$ film 14 as a mask (FIG. 8(d)). Then, the photo-resist 15 is peeled off, and the SiO$_2$ film 14 is exposed (FIG. 8(e)).

Next, the engraved area 7 can be formed by wet etching method, for example, by using the remained SiO$_2$ film 14 as a mask (FIG. 8(f)). Finally, the upper stopper substrate 5 can be completed by removing the remained SiO$_2$ film 14, which has served as a mask. It should be noted that, the lower stopper substrate 6 can be manufactured by a similar process to that mentioned in the above. The engraved areas 7s are formed by wet etching method, so that high accuracies will not be obtained. Then, the nonuniformity of the depth in each engraved area and the inequality of the depths between different engraved areas will not be so small. However, in the embodiment of the invention, the clearance 9 and 10 are not wholly formed by etching, but only limited portions of them are formed by etching. Then, the nonuniformities of the depths of the engraved areas can be limited within smallest possible values, and consequently the accuracies of the clearances 9 and 10 can be improved on the whole.

Figure 9:
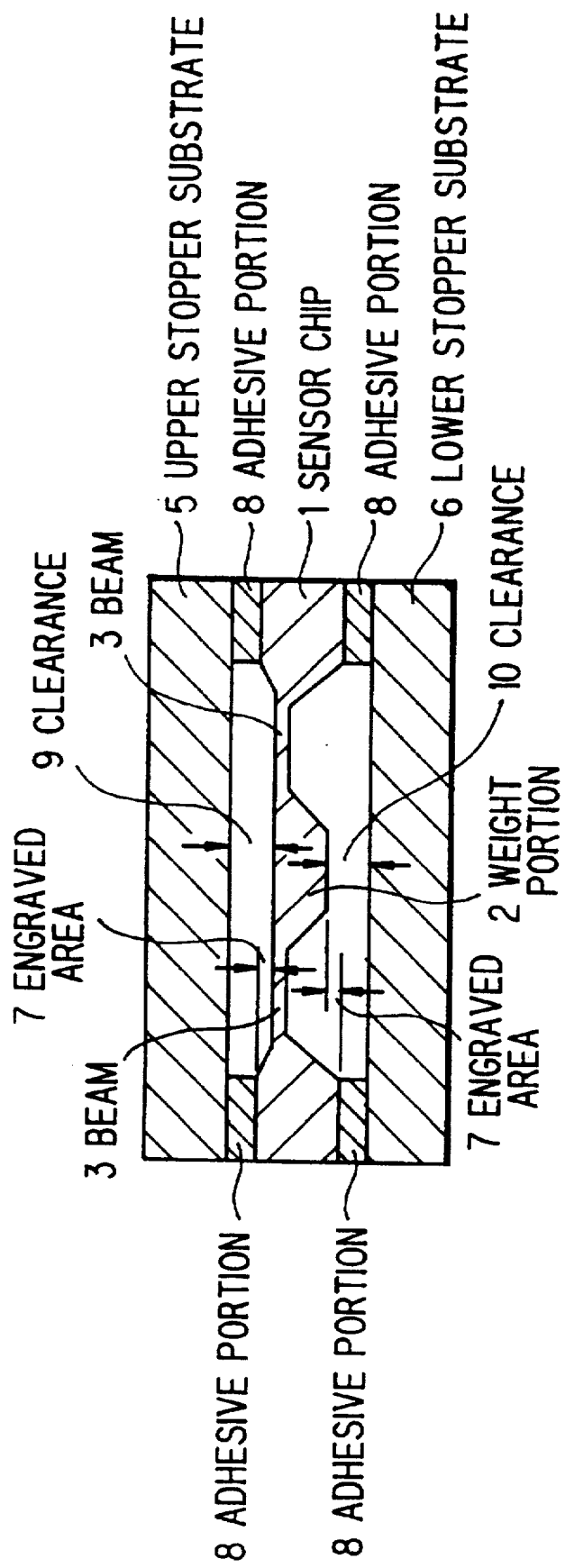
FIG. 9 is a cross-sectional view of the second preferred embodiment of the invention.

FIG. 9 is the cross-sectional view of the second preferred embodiment. In this drawing, the structural elements with the same functions as those shown in the first preferred invention are denoted by the same reference numerals, and overlapped descriptions will be omitted. The difference between the first and second preferred embodiments is that, although the engraved areas 7s are formed on the upper and lower stopper substrates in the first preferred embodiment, they are respectively formed on the upper and lower surfaces of the sensor chip 1 in the second preferred embodiment. Similar effects to those obtained in the first preferred invention can be obtained by the embodiment shown in FIG. 9.

As mentioned in the above, in the semiconductor acceleration sensor according to the invention, the clearances between the weight portion and the stopper substrates are composed of the engraved areas on the stopper substrates, or those on the upper and lower surfaces of the sensor chip and the adhesive portion. Then, even if the minute particles in the adhesive portion get into the clearance, when being used, the vibration of the weight portion in the clearances is not disturbed. Moreover, even if the dusts come down on the clearances, when being manufactured, the vibration of the weight portion is never obstructed. When the depth of the engraved area is shallow, the accuracy of the clearance can be improved. According to the invention, the acceleration sensor with high reliability and high quality can be supplied at cheap prices.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A semiconductor acceleration sensor comprising:

a sensor chip, which is composed of a weight portion and at least two beam portions for supporting said weight portion at both side ends thereof;

two stopper substrates which run in parallel with each other and contain said sensor chip therebetween, wherein upper and lower surfaces of said sensor chip have engraved areas with predetermined depths, and two adhesive portions, comprised of a mixture of an adhesive agent and minute spherical particles having equal diameter, which stick said sensor chip to said stopper substrates.

2. A semiconductor acceleration sensor, according to claim 1, wherein:

said predetermined depths of said engraved areas on upper and lower surfaces of said sensor chip are slightly larger than displacement of said weight portion corresponding to a maximum acceleration to be measured.

3. A semiconductor acceleration sensor, according to claim 1, wherein:

a sum of depths of engraved areas on upper and lower surfaces of said sensor chip and said diameter of said minute spherical particles is determined such that a resonant vibration of said weight portion can be suppressed.

4. A semiconductor acceleration sensors according to claim 1, wherein:

said minute spherical particles are made of hard plastics, and said mixture is obtained by mixing minute spherical particles with adhesive agent by more than 1.0 wt %.

5. A semiconductor acceleration sensor comprising:

a sensor chip, which is composed of a weight portion and at least two beam portions for supporting said weight portion at both side ends thereof, two stopper substrates which run in parallel with each other and contain said sensor chip therebetween, wherein inner surfaces of said stopper substrates have engraved areas with predetermined depths, and two adhesive portions, comprised of a mixture of an adhesive agent and minute spherical particles having equal diameter, which stick said sensor chip to said stopper substrates.

6. A semiconductor acceleration sensor, according to claim 5, wherein:

said predetermined depths of said engraved areas on said inner surfaces of said stopper substrates are slightly larger than displacement of said weight portion corresponding to a maximum acceleration to be measured.

7. A semiconductor acceleration sensor, according to claim 5, wherein:

a sum of depths of engraved areas on inner surfaces of said stopper substrates and said diameter of said minute spherical particles is determined such that a resonant vibration of said weight portion can be suppressed.

8. A semiconductor acceleration sensor, according to claim 5, wherein:

said minute spherical particles are made of hard plastics, and said mixture is obtained by mixing minute spherical particles with adhesive agent by more than 1.0 wt %.

* * * * *